United States Patent Office 2,961,097
Patented Nov. 22, 1960

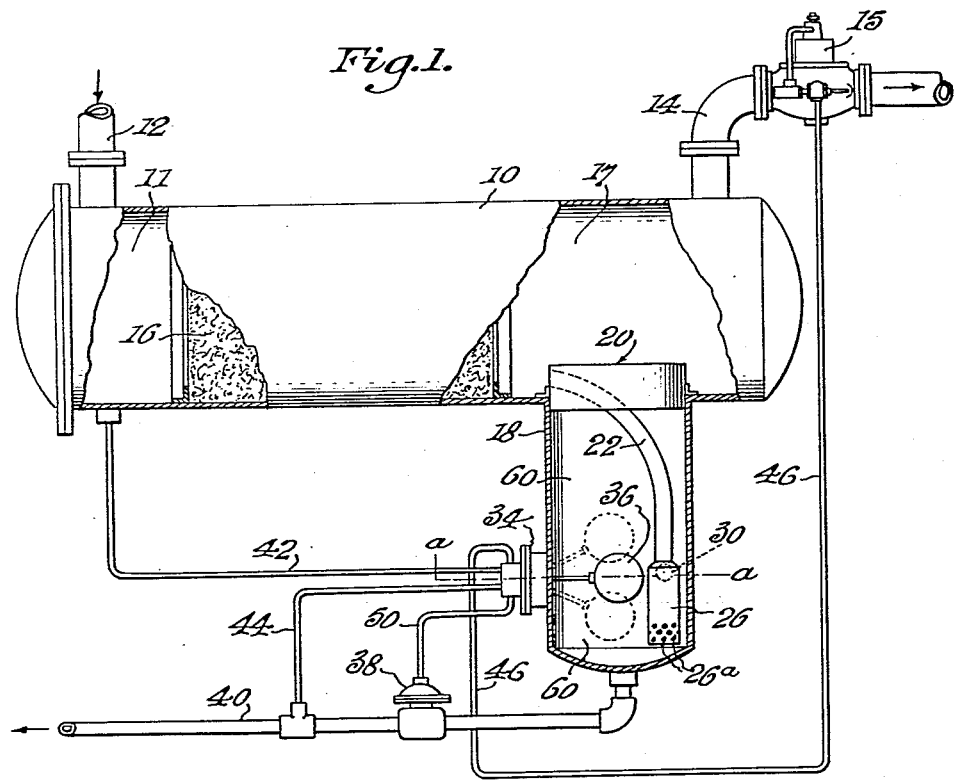
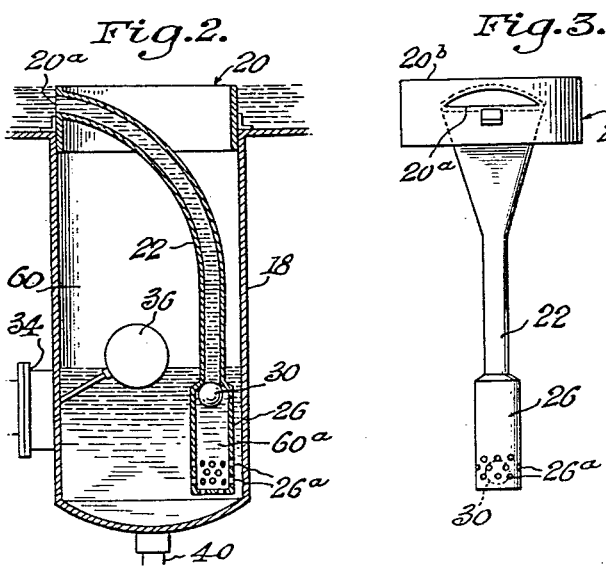
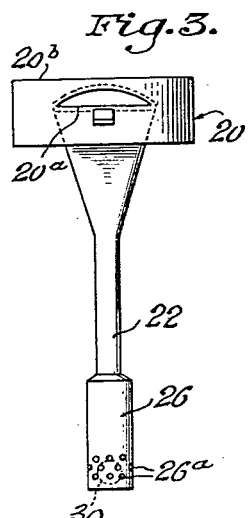
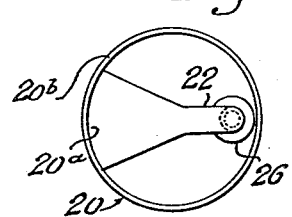

2,961,097
LIQUID SEPARATOR WITH WATER FLOW CONTROLLER

Michael G. Grant, Alexandria, Va.
(135 E. Birckhead St., Baltimore 30, Md.)

Filed Jan. 27, 1959, Ser. No. 789,466

4 Claims. (Cl. 210—128)

(Granted under Title 35, U.S. Code (1952), sec. 266)

The invention described herein may be manufactured and used by or for the Government for governmental purposes without the payment of any royalty thereon.

This invention relates generally to improvements in apparatus for filtrating and separating liquids having different specific gravities.

The instant invention relates more specifically to a separator and flow control in which the water in a fuel is periodically trapped and separated from the liquid fuel by action of an interfacial oil and water float which by linkage means operates a flow control valve, releasing the water at a certain level in the sump portion of the fuel tank by a flow control valve and pipe drain communicating with the lower sump portion of the fuel tank. The flow of separated water is controlled during its descent into the water-collecting sump by a 360 degree weir which prevents an emulsion from forming on the interface of the fuel and water mixture in the fuel tank even during periods of high rate of flow of water. The instant separator facilitates a more rapid, smooth, and efficient means of separating water from the fuel preparatory to use of the fuel. High rates of flow in refueling jet aircraft as employed in the aircraft industry or military service require a filter separator capable of separating water and fuel under high rate of flow conditions.

It is therefore a primary object of this invention to provide a filter separator apparatus for liquid fuels which will continuously separate contaminants having different specific gravities, such as water, from the fuel under conditions of normal and high rates of flow of mixtures of contaminants and fuel through the filter separator.

It is another object of this invention to provide a new liquid separator that will substantially eliminate the presence of an excessive amount of fuel in the discharge of contamination water from the fuel.

Another object of this invention is to provide a construction for a sump and water separation means which will permit modification of existing fuel tanks in aviation service so as to meet all requirements of military and commercial aviation service of quickly filtering and separating contaminating water from the fuel when pumping fuel through said fuel tanks for delivery to a plane.

With these and other objects in view, the invention includes certain novel features herein described with reference to the drawings which accompany and form a part of this specification.

In the drawings:

Fig. 1 shows the general embodiment of the invention;

Fig. 2 is an enlarged vertical section of the sump shown in Fig. 1;

Fig. 3 is an elevation of the 360 degree weir with downspout attached; and

Fig. 4 is a plan view thereof.

Instant apparatus will maintain at all times an interface between the liquid fuel and water in the tank or in the sump so that water will not be discharged with the fuel supply or fuel with the discharged water.

Referring to Fig. 1, reference numeral 10 designates the horizontal fuel tank including fuel inlet chamber 11, filter section 16, and fuel outlet chamber 17. Fuel is supplied through inlet 12 and discharged through outlet 14 including discharge control valve 15. A sump 18, weir 20 including downspout 22 terminating in a water release section 26 having perforations 26a communicates between the chamber 60 of sump 18 and chamber 60a of release section 26 permitting fluid to flow uniformly between said two chambers. Weir 20 allows for an even water discharge into sump 18 during periods of constant water contamination of the fuel or high rates of flow. The water flows around the 360 degree weir 20 building up to a point of even-overflow. Downspout 22, as shown in Figs. 3 and 4, is enlarged at its top portion and joined to the elliptical opening in weir 20 to receive the maximum amount of water during periods when the separator is receiving 100 percent water slugs. Water release section 26 of downspout 22, contains a ball valve 30 and perforations 26a, the latter permitting communication with the internal chamber of sump 18 and allowing accumulated water collected in downspout 22 to flow to the inside chamber 60 of sump 18. Release section 26 contains therein the ball valve 30 which floats in water but not in a fluid fuel having a specific gravity of less than unity. The operation of the ball valve will be more fully explained hereinafter.

Controller device 34 may be any suitable commercial float controller, for example, Cla-Val Model Nos. C–197 or C–198 of type CFF, manufactured by Clayton Valve Co., of Alhambra, California. Controller 34 cooperates with water release section 26 of downspout 22 and is actuated by ball float 36 in sump 18. The ball float is buoyant only in fluid having a specific gravity not less than unity, or in this instance, in water. Controller 34 is connected to chamber 16 by connection 42, and by line 44 to water discharge pipe 40. When ball float 36 is in the upper dotted position of Fig. 1, above line a—a, controller 34 actuates by connection 50 water discharge or diaphragm valve 38, and by connection 46, the automatic fuel shutoff discharge or diaphragm valve 15. Pipe 42 is the high pressure feed line and supplies liquid under pressure to actuate diaphragm valves 15 and 38. Pipe 44 is a bleed-off line from the regulator valve which relieves liquid used to actuate the diaphragm valves when they return to their normal position. Connections 50 and 46 may be pressure-hydraulic lines, pressure-electric responsive connections, or other suitable linkage well known in the art.

Fig. 2 illustrates the cooperative action of ball valve 30 and ball float 36 in which ball float 36 is in discharge position to actuate water controller 34 to discharge water from sump 18 through pipe 40. Ball valve 30 by its float action prohibits a further flow of water down downspout 22 during heavy water contamination of the fuel and selectively causes the excess of water to flow over the upper edge of weir 20 down the inside surface of the wall of sump 18 and be discharged through pipe 40 upon opening of valve 38. This action permits a rapid and efficient separation of the water and fuel without the formation of an emulsification of the fuel and water at their interfaces, thus preventing malfunction of the automatic float control 34 and water release section 26. When float 36 is in its uppermost dotted position, controller 34 by connection 46 cuts off fuel flow valve 15 until an interface is established between the liquid fuel and the water present in sump 18 such that float 36 begins to drop to its intermediate position as represented by line a—a in Fig. 1, to prevent any water from flowing out with the fuel discharge line 14.

One of the points of novelty of instant invention resides in the multi-mode operation of this invention. Low percents of water contamination of liquid fuel, and occasional slugs of water are each taken care of by the combined effect of the weir 20, supplementary weir 20a, downspout 22, float valve 30, and ball float 36. With low percents of water contamination ball float 36 is in its bottom dotted position in Fig. 1, and when the water contamination of the fuel is particularly heavy ball valve 30 by its float action prohibits further flow of water through the downspout 22, as shown in Fig. 2. When this condition exists, the instant structure selectively causes the water in the contaminated fuel to flow over the top surface 20b of weir 20. The higher specific gravity of the water causes it to descend to the bottom of the tank 11 while the liquid fuel remains on top of the water and can flow out of the tank through piping 14. The present device will effectively separate the excess of water from the oil or fuel without emulsifying action at the interface of liquid fuel and water which would, in certain circumstances, result if ball float 36 was in its upper dotted position in Fig. 1. While filter 16 provides much of the breaking of the emulsion, however, if no provisions are made to control the water that has been broken out of the emulsion, an emulsion can re-form where the water contacts the fuel-water interface in sump 18. The weir construction of the instant device prevents such formation in sump 18. Instant device is not intended to break an emulsion of fuel and water but rather to control the water that has been broken from the emulsion by the coalescing media and prevent an emulsion from forming at the fuel-water interface in sump 18.

Functionally, during operation of the instant apparatus, fuel enters tank 10 by pipe 12 into chamber 11 and passes through filter 16 which removes the solids or sedimentary particles in the flowing fuel. The filtered fuel containing possible contaminating water enters chamber 17 of tank 10, flows around and over weir 20 and, if the fuel contains no water, ball float 36 remains in its lower dotted position shown in Fig. 1 and float valve 30 is positioned at the bottom of release section 26 juxtaposed to screen orifice means 26a. If the fuel passing around weir 20 contains an occasional water slug, it passes over supplementary weir 20a and down downspout 22 through chamber 60a through screen means 26a into chamber 60 of sump 18. After water has accumulated above line a—a of Fig. 1, ball valve 30 rises and prevents further entry of water through downspout 22 while ball float 36 moves to the upper dotted position of Fig. 1 and actuates controller 34 which opens valve 38 to discharge the contaminating water from sump 18 through discharge pipe 40. At the same time controller 34 automatically closes valve 15 through connection 46 to allow sufficient time for all of the contaminating water of the fuel to settle in the sump 18 and be discharged from the fuel tank before further discharge of fuel through member 14, thus preventing possible discharge of slugs of water with fuel through fuel discharge pipe 14.

If the fuel is heavily contaminated with water, then downspout 22 admits water until ball valve 30 by its buoyancy rises to close the downspout, as shown in Fig. 2, and prevents further accumulation of contaminating water in downspout 22 thus causing the excess heavier fluid or water to pass over the top edge of weir 20 and then down the inside surface of the wall of chamber 60, thus allowing the contaminating water to accumulate in sump 18 without an emulsion at the interface of the fuel and water layers which may be positioned at or near the three different indicated positions of ball float 36, as shown in Figs. 1 and 2. Of course, ball valve 30 and ball float 36 float in water but not the fluid fuel, and when ball float 36 is positioned again in its upper dotted position of Fig. 1, then water controller 34 by connection 50 opens water dump valve 38 and water controller 34 by connection 46 closes fuel shut-off valve 15 by, or without, a certain time lag, if necessary, until ball float 36 is positioned in its lower dotted position shown in Fig. 1 to permit a complete discharge of the accumulated contaminating water to prevent the discharge of contaminating water with the fuel through valve 15 and fuel discharge pipe 14. Of course, when ball float 36 is returned after the water dumping operation to its lower dotted position as in Fig. 1, water dump valve 38 is closed and fuel valve 15 is again opened to permit the further continued flow of clean, filtered, and purged fuel through fuel discharge pipe 14.

It is to be understood that valve means 15, water controller 34, and water dump valve 38 are commercial products and well known to those skilled in the art.

Thus, by the cooperative operation of weir means 20, supplementary weir means 20a, downspout member 22, water controller 34, water dump valve 38, and fuel cut-off valve 15, it is seen that a positive means of separating contaminating water from fuel under varying conditions of contamination is accomplished in the art of liquid separation and filtration.

While there has been described what is at present considered to be the preferred embodiment of this invention, it will be obvious to those skilled in the art that various changes and modifications may be made therein without departing from the invention.

I claim:

1. Fluid fuel and water separation apparatus comprising a container having an inlet, a valved outlet and a sump including float actuated fluid level control means, a mass of fibrous filtering material in said container between said inlet and valved fuel outlet, means interconnecting said valved fuel outlet and said float actuated fluid level control means for controlling the discharge of said valved fuel outlet responsive to predetermined levels of water in said sump, a cylindrical weir interconnecting said container and said sump, said cylindrical weir having a circular crest and a secondary weir in the wall of said cylindrical weir, said secondary weir defined by an opening below said circular crest and within said container, conduit means connecting said secondary weir with a chamber including means for discharging liquid within said sump, float valve means within said chamber controlling the flow of water between said chamber and said sump and water discharge means connected to said sump including sump discharge valve means connected to said float actuated fluid level control means for operation of said sump discharge valve responsive to predetermined levels of water in said sump, whereby small and large volumes of water may be separated from water-contaminated fuel supplied to said container and discharged through said sump through selective control of said sump discharge valve means and said valved fuel outlet by said float actuated fluid level control means in said sump.

2. In a separator for separating water from a hydrocarbon liquid having in combination, a container having an inlet and valved outlet, a sump connected to said container and communicating therewith through an aperture in said container, a body of fibrous filtering material in said container between said inlet and valved outlet, a collar supported in the aperture in said container and projecting into said sump and said container, an edge of said collar projecting into said container constituting a circular weir crest, an opening in the portion of the wall of said collar within said container and below said circular weir crest constituting a secondary weir, a chamber located adjacent the bottom of said sump and including means for discharging liquid into said sump, said chamber having a float valve controlled inlet, a conduit connecting said opening to the float valve controlled inlet of said chamber, fluid level control means mounted on said sump and including a float actuated lever responsive to variations in level of liquid accumulated within said sump, water discharge means connected to said sump including a sump discharge valve, said sump discharge valve and said valved outlet connected to said fluid level control means for controlling the discharge of water and fuel from said sump and said container, respectively, responsive to predetermined levels of water in said sump, whereby small and large volumes of water may be separated from water-contaminated fuel supplied to said container and said sump may be periodically drained of accumulated water through selective control of said sump discharge valve and valved fuel outlet by said float actuated fluid level control means.

3. In a separator for separating two immiscible liquids, one of which has a greater specific gravity than the other, comprising a container having an inlet and valved outlet, a sump connected to said container and communicating therewith through an aperture adjacent said valved outlet in said container, a body of fibrous filtering material transversely disposed across said container between said inlet and valved outlet, a collar supported in the aperture in said container between the discharge end of said fibrous filtering material and said valved outlet and projecting into said sump and said container, an edge of said collar projecting into said container constituting a circular weir crest, an opening in the portion of the wall of said collar within said container and below said circular weir crest constituting a secondary weir, a chamber located adjacent the bottom of said sump including means for discharging the two liquids into said sump, said chamber having a valve controlled inlet and a float buoyant in the higher specific gravity liquid for closing said valve controlled inlet when a predetermined quantity of the higher specific gravity liquid is present in said chamber and said sump, a conduit connecting said opening with the inlet of said chamber, liquid level control means carried by said sump and including a lever extending into said sump and terminating in a float buoyant in the higher specific gravity liquid, said liquid level control means being actuated responsive to predetermined quantities of liquid of higher specific gravity in said sump, conduit means for discharging liquid of higher specific gravity from said sump including a sump discharge valve, said sump discharge valve and said valved outlet on said container connected to said liquid level control means for controlling the discharge of higher specific gravity liquid from said sump and lower specific gravity liquid from said container responsive to movement of said float terminated lever by the higher specific gravity liquid in said sump whereby two immiscible liquids may be separated.

4. In a separator for separating water from liquid fuel having in combination, an elongated container having an inlet at one end and a valved outlet at the other end thereof, a body of fibrous filtering material transversely disposed across said elongated container between said inlet and valved outlet for filtering water-contaminated fuel supplied through said inlet to said elongated container, a sump connected to said elongated container between the discharge end of said fibrous filtering material and said valved outlet and communicating therewith through an aperture in said elongated container, a collar supported in the aperture in said elongated container and projecting through said aperture into said sump and said container, the edge of said collar projecting into said elongated container constituting a circular weir crest, an opening in the portion of the wall of said collar within said container and below said circular weir crest constituting a secondary weir, an elongated chamber having a perforated portion located within and adjacent the bottom of said sump, said elongated chamber having a float for controlling liquid flow through said chamber and a valve controlled inlet remote from said perforated portion to said sump, a conduit connecting the entire opening of said secondary weir to the inlet of said elongated chamber, fluid level control means including a float actuated lever mounted on said sump, said float actuated lever projecting into said sump for communication with liquid in said sump, said fluid level control means being actuated responsive to predetermined variations in liquid level in said sump, water discharge means including a sump discharge valve connected to said sump, said sump discharge valve and said valved outlet connected to said fluid level control means for controlling the discharge of water and fuel from said sump and said container, respectively, responsive to predetermined levels of water in said sump, whereby small and large volumes of water may be separated from water-contaminated fuel supplied to said container and said sump may be periodically drained of accumulated water through selective control of said sump discharge valve and valved fuel outlet by said float actuated fluid level control means.

References Cited in the file of this patent
UNITED STATES PATENTS

| | | |
|---|---|---|
| 1,103,345 | Burgess | July 14, 1914 |
| 1,252,099 | Donovan | Jan. 1, 1918 |
| 2,609,099 | Griswold | Sept. 2, 1952 |
| 2,713,919 | Walker | July 26, 1955 |
| 2,723,757 | Brunton | Nov. 15, 1955 |
| 2,826,306 | Burns | Mar. 11, 1958 |